(12) United States Patent
Bilby et al.

(10) Patent No.: US 9,191,298 B1
(45) Date of Patent: Nov. 17, 2015

(54) DISTRIBUTED FORENSIC INVESTIGATION

(75) Inventors: Darren J. Bilby, Horgen (CH); Michael I. Cohen, Horgen (CH); Germano Caronni, Zurich (CH)

(73) Assignee: GOOGLE INC., Mountain View, CA (US)

( * ) Notice: Subject to any disclaimer, the term of this patent is extended or adjusted under 35 U.S.C. 154(b) by 669 days.

(21) Appl. No.: 13/136,506

(22) Filed: Aug. 1, 2011

(51) Int. Cl.
*G06F 15/173* (2006.01)
*H04L 12/26* (2006.01)

(52) U.S. Cl.
CPC ............ *H04L 43/10* (2013.01); *H04L 12/2678* (2013.01); *H04L 43/50* (2013.01)

(58) Field of Classification Search
CPC ........... H04L 1/24; H04L 43/10; H04L 43/50; H04L 12/2697
USPC .......................................... 709/223, 224, 217
See application file for complete search history.

(56) References Cited

U.S. PATENT DOCUMENTS

| | | | |
|---|---|---|---|
| 4,097,696 A * | 6/1978 | Nyhuis et al. | 379/49 |
| 5,873,086 A * | 2/1999 | Fujii et al. | 1/1 |
| 5,892,903 A * | 4/1999 | Klaus | 726/25 |
| 5,918,004 A * | 6/1999 | Anderson et al. | 714/38.13 |
| 5,944,839 A * | 8/1999 | Isenberg | 714/26 |
| 5,983,364 A * | 11/1999 | Bortcosh et al. | 714/25 |
| 6,304,982 B1 * | 10/2001 | Mongan et al. | 714/38.14 |
| 6,357,017 B1 * | 3/2002 | Bereiter et al. | 714/27 |
| 6,625,648 B1 * | 9/2003 | Schwaller et al. | 709/224 |
| 6,829,227 B1 * | 12/2004 | Pitt et al. | 370/329 |
| 7,966,522 B2 * | 6/2011 | Fabbrocino | 714/26 |
| 8,000,650 B2 * | 8/2011 | Chang et al. | 455/11.1 |
| 2002/0104042 A1 * | 8/2002 | Wong et al. | 714/38 |
| 2007/0118779 A1 * | 5/2007 | Wu et al. | 714/725 |
| 2007/0288226 A1 * | 12/2007 | Higeta et al. | 703/24 |
| 2008/0293365 A1 * | 11/2008 | Sim et al. | 455/67.14 |
| 2009/0063509 A1 * | 3/2009 | Lockhart et al. | 707/10 |

* cited by examiner

*Primary Examiner* — Madhu Woolcock
(74) *Attorney, Agent, or Firm* — Procopio, Cory, Hargreaves & Savitch LLP (57) ABSTRACT

Methods, systems, and apparatus, including computer programs encoded on a computer storage medium, for distributed forensics analysis. In one aspect, a method includes sending one or more requests to a client as part of a serialized flow for performing forensics analysis associated with the client; suspending the serialized flow at a first state; receiving responses to the one or more requests; resuming the flow at the first state to process the received responses; and advancing the serialized flow to a second state.

34 Claims, 7 Drawing Sheets

DISTRIBUTED FORENSIC INVESTIGATION

BACKGROUND

This specification relates to network communications.

In a conventional enterprise environment, digital investigations are often associated with incident response. Incident response includes the detection and investigation of system compromises and targeted attacks. Within a corporate setting, for example, investigations typically focus on timely response and damage assessment in addition to maintaining evidentiary standards. The typical enterprise owns and deploys many machines, or assets, serving a multitude of roles, for example, workstations, laptops, and servers. All these machines can be used as launch points for internal attacks and may become involved in forensic investigations. Traditional forensic acquisition of machine data includes shutting the target machine down, removing its disk and acquiring a bit for bit copy of the drive, followed by a manual analysis of the drive image.

SUMMARY

This specification describes technologies relating to distributed forensics analysis.

Distributed forensics investigation and analysis can be performed and scaled to a large number of devices. A management device can communicate with agents on respective devices, for example, within an enterprise. The communications can use serialized processes that can be suspended at particular states. These serialized process flows can be suspended, for example, while the client devices are performing and reporting results of one or more actions. Consequently, a server can be managing many different flows to many different client devices concurrently. Received responses are assigned to particular queues for processing by workers, which can include proceeding to a next state of the serialized process flow. Responses to client actions can be combined into operations by the management device.

In general, one aspect of the subject matter described in this specification can be embodied in methods that include the actions of sending one or more requests to a client as part of a serialized flow for performing forensics analysis associated with the client; suspending the serialized flow at a first state; receiving responses to the one or more requests; resuming the flow at the first state to process the received responses; and advancing the serialized flow to a second state. Other embodiments of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

These and other embodiments can each optionally include one or more of the following features. Advancing the serialized flow to the second state includes sending one or more additional requests to the client and suspending the serialized flow at the second state. One or more different serialized flows can be active while the serialized flow is suspended at the first state. The serialized flow has defined serialization points for suspending the serialized flow. Each request of the one or more requests causes the client to execute a client action. The received responses are stored in a queue until a status message is received indicating that all responses have been received. The serialized flow is to copy a file from the client. The method further includes receiving a progress update to a request of the one or more requests, the update including a state of the action being performed; and sending the received state to the client in response to a failure in the client action.

In general, one aspect of the subject matter described in this specification can be embodied in methods that include the actions of receiving responses from multiple serialized flows from one or more clients, each response associated with a particular client action; assigning each response to an associated queue; and for each queue, notifying a particular worker to resume a flow from a suspended serialized state to process corresponding responses in the queue once all responses for an associated request are received. Other embodiments of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

These and other embodiments can each optionally include one or more of the following features. The method further includes decrypting each received response before assigning to an associated queue. A resumed flow is advanced to a next state and one or more additional requests are submitted to the corresponding client of the one or more clients. Notifying the particular working includes sending a message to a message queue of the worker.

Particular embodiments of the subject matter described in this specification can be implemented so as to realize one or more of the following advantages. Forensic analysis can be scaled to a large number of machines while conserving management and analysis resources. Analysis tasks can be dynamically dispatched to a large number of machines while minimizing response time. Forensics requests can be targeted to automated pre-devised tasks to preserve privacy. Forensic analysis can be performed remotely including disk imaging and data transfer. Multiple investigators can work on separate forensics tasks on the same device. For example, a cached representation of the machine can be generated to reduce bottlenecks and collisions. Preemptive monitoring can be performed on active devices. When a specific signal of intrusion is detected on a machine, other machine can be quickly checked in parallel for the same signal. A history and cached state of a machine can be collected prior to an incident aiding in faster determining of the cause and signals of the incident.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
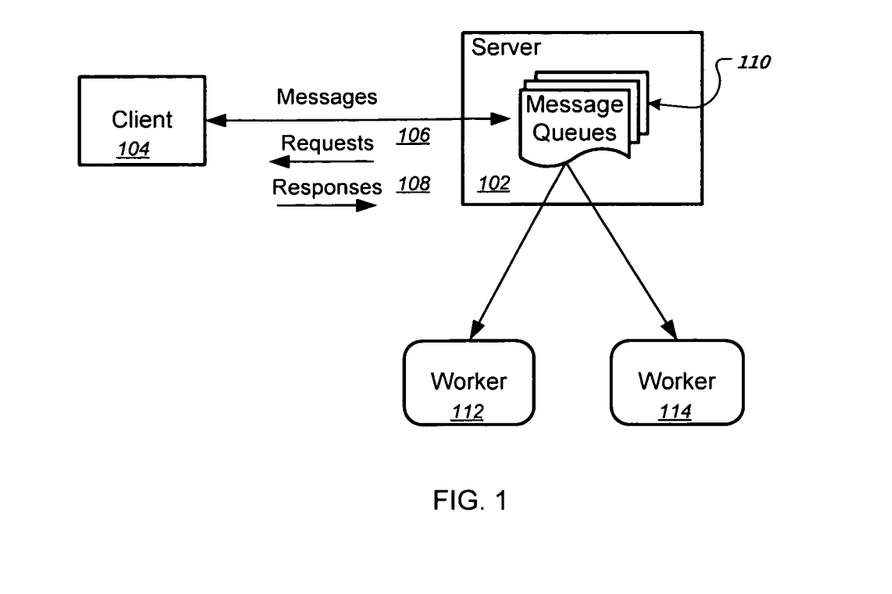
FIG. 1 is a diagram illustrating example communication paths for a forensic analysis system in accordance with an embodiment.

FIG. 1 is a diagram 100 illustrating example communication paths for a forensic analysis system. A management device 102 (e.g., a server) communicates with device 104 (e.g., a client) using messages. The management device 102 can perform forensic management for one or more client devices. Messages sent from the management device 102 to the device 104 are referred to as requests 106. Messages sent from the device 104 to the management device 102 are referred to as responses 108. A single request 106 can results in multiple responses 108 being received by the management device 102.

In some implementations, the device 104 communicates with the management device 102 using Hypertext Transfer Protocol (HTTP). The device 104 receives one or more requests and submits batched responses over periodic HTTP POST requests. A POST request is an HTTP request technique for sending data over a network that includes the message body in the request. Alternatively, other messaging techniques can be used. For example, different point-to-point protocols can be used (e.g., transmission control protocol (TCP), Xpress Transport Protocol (XTP)). Alternatively, store-and-forward protocols can be used, for example, Simple Mail Transfer Protocol (SMTP).

In some implementations, the device 104 includes an agent that the management device 102 can communicate with. The agent can satisfy requests received from the management device 102 by running particular client actions. Client actions are code routines on the device that receive a request and generate one or more responses to the request. Client actions can provide access to the operating system's application programming interfaces (APIs), e.g., reading a file or listing a directory. In some implementations, the agent is also able to forensically analyze registry files on a running device. Furthermore, in some implementations, memory analysis tools are incorporated into the agent to aid in analyzing raw system memory on the device. The agent can also use raw interfaces to access raw disk or solid state drive (SSD) drivers, and to analyze the file system information with custom drivers, avoiding the operating system APIs.

While only one device 104 is shown, the management device 102 can connect to multiple devices including concurrent communications with more than one device. The device 104 has its own message queue 110 on the management device 102 from which requests directed to the device 104 are drawn. Other devices can have their own respective message queues. The message queue can be based on a unique identifier for each device (e.g., a client common name).

The management device 102 is also in communication with workers 112 and 114. Each worker 112 and 114 is a specialized process that handles responses received from devices by drawing them from specified queues. In some implementations, an individual device 104 can only receive requests intended for the device 104 (e.g., based on the device identifier), but can send responses to differed worker queues (e.g., device 104 can send responses to either worker 112 or worker 114). In some implementations, the responses received from a device (e.g., device 104) are assigned to a particular worker (e.g., worker 112 or 114) at random unless they belong to a specialized task for which particular workers are assigned to process.

Communications between the management device 102 and the device 104 is encrypted. For example, the communications can be encrypted using an advanced encryption standard level symmetric-key encryption (e.g., AES256) with a random session key and initialization vector (IV) including an initial certificate signing request (CSR) exchange. The session key is in turn encrypted using a public key while messages are also signed using the private key of the sender. Setup and use of encrypted communications is described in greater detail below with respect to FIG. 2.

If a management device 102 certificate (e.g., using an internal certification authority whose public key is hardcoded on all devices 104) is compromised, a new certificate can be rapidly deployed. Each device 104 periodically checks for a "latest server certificate" over the network, and upgrades its locally stored copy if needed.

Issuing a request 106 message by the management device 102 causes the device 104 to execute an action. The action is a specific routine that performs a single primitive action. For example, the device 104 can have a ReadBuffer (path, offset, length) primitive that reads up to a given amount of data from a file at a specified offset. These simple primitives can be combined into arbitrarily complex operations by the management device 102. For example, simple actions, such as reading a buffer from a file, raw disk, or memory, can be combined on the server to produce more complex forensic analysis. Similarly, randomly reading buffers from raw memory can be combined on the server, to analyze the live memory image.

Replay attacks can be problematic in a remote forensic system. If an attacker is able to capture device responses to a routine request and replay them, the management device might record old or out of date data about the device, potentially displacing recent data. However, sequencing each response 108 makes replaying the POST messages is ineffective. The management device 102 will simply drop out of sequence replayed messages as retransmissions. In addition, a timestamp of a request 106 sent by the management device 102 is included within the encrypted and signed payload of each POST response 108. The device 104 can require an incrementing timestamp between POST requests. If timestamps do not agree, the management device 102 requests 106 are ignored.

Figure 2:
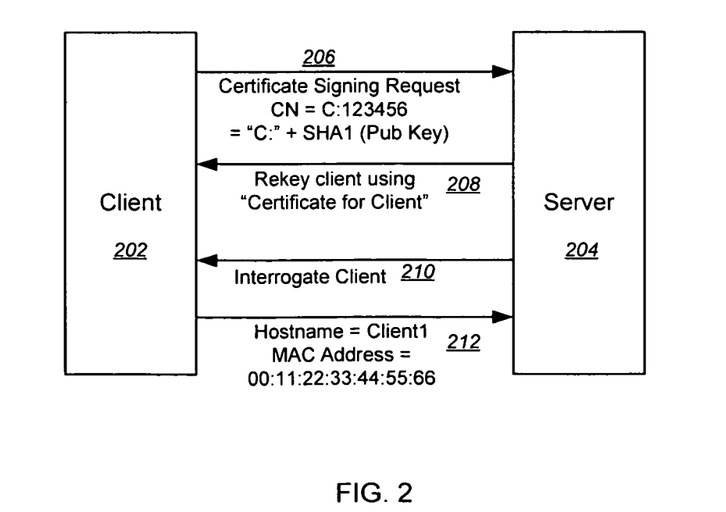
FIG. 2 is a diagram illustrating an example device enrollment in accordance with an embodiment.

FIG. 2 is a diagram 200 illustrating an example device enrollment. A device can be enrolled by distributing a client agent to the device. Since all device communication is encrypted, devices 202 obtain a respective certificate (e.g., X.509) prior to an initial communication with the management device 204. The device 202 can then automatically request enrollment. The device 202 enrolls by automatically creating a certificate signing request 206 with a unique client common name (CN). A certificate signing request is a message sent from an applying device to a certificate authority (e.g., the management device 204) in order to apply for a digital identity certificate.

In some implementations, the client includes a hardcoded certificate authority certificate that is used to sign a current public key of the management device. At startup, the client dynamically fetches the current public key of the management device from a publicly accessible certificate and validates the certificate authority signature on it. The client can then generate a random public-private key pair, uses a hash of the public key as the CN for the client, issues a certificate signing request for this key pair, and sends the certificate signing request to the management device.

The certificate signing request is then encrypted with the server public key, and sent to the management device 204 for signing. The management device 202 signs this certificate signing request and returns 208 a certificate (e.g., X.509) for the device 202, e.g., an identity certificate that has been digitally signed with the private key of the certificate authority of the management device 202. In some implementations, the management device 204 unconditionally signs the certificate signing request after validating name construction rules, and returns a signed client certificate to the device 202.

When the management device 204 generates a certificate for the device 202, it also stores the certificate, e.g., in a database. All future communications with the particular device 202 use this stored certificate. To revoke the device 202, this key is deleted from the database.

Since the device 202 creates the certificate signing request and chooses the CN, it would be possible for a rogue client to impersonate any other client by simply creating a new certificate signing request containing the other clients CN, and communicating with the management device 204 using this new certificate. This would allow for impersonation attacks, and potentially compromise the integrity of forensic evidence. Enforcing the CN to be dependent on a hash of the certificate public key ties the CN to the private key, preventing impersonation attacks. A rogue device cannot create a valid CSR having a predetermined CN of another device, with a meaningful key pair, without also knowing the other client's private key.

After enrollment, the management device 204 initiates a discovery flow, querying 210 the device 202 for common identifying attributes. These are provided in a response 212 to the management device 204. The device identifiers are uniquely associated with a knowledge base about the device 202 (e.g. host name, internet protocol (IP) address, or media access control (MAC) address). The device CN is used as a unique identifier in all information kept about the client. Thus, the integrity of each device is independent.

The device can use a random session key for each message encryption and includes that session key, encrypted with the current server public key, in the message. Each message can also be hashed, e.g., with sha-256, and signed with the client private key. The management device sends messages to the client signed with its private key, encrypted with a session key that is encrypted in the client public key. Integrity is validated by the respective recipient of messages. The management device can also check a blacklist of keys.

A management device can communicate with many enrolled devices (e.g., thousands of clients). However, only a fraction of those devices may be accessible at any given point in time. Additionally, automated analysis can include executing many sequential steps. For example, the steps in performing a particular analysis can include listing a directory, identifying the executables, and then calculating each file's hash.

State serialization can be used to suspend execution of analysis processes for each client device. These serialized forms are then stored dormant until the client device responds. Thus, the management device resources are freed for other tasks while waiting for the client to respond. The serialized forms are referred to in this specification as "flows." Flows are state machines with specified serialization points, where it is possible to suspend their execution. In some implementations, flows are executed using particular programming languages, e.g., Python programming language, and serialized using a serialization module for object serialization (e.g., pickle module in Python). The serialization can use a stack-based virtual machine that records the instructions used to reconstruct the object.

In some implementations, a flow can include requests for particular actions that take more time for the client to perform. An iterator can be used to check-point long-lived client actions on the management device (e.g., server) side. For example, if a particular request to a client device is to search all files on disk for a specific regular expression, the client can periodically report progress to the server. For example, indicating a number of results found so far and a current opaque internal state of the action or operation. If the action does not conclude, e.g., due to a client machine reboot, the management device can instruct the client when it becomes available again to resume the action. In particular, the management device can provide the last internal state of the action so that the client does not start the action over at the beginning.

Figure 3:
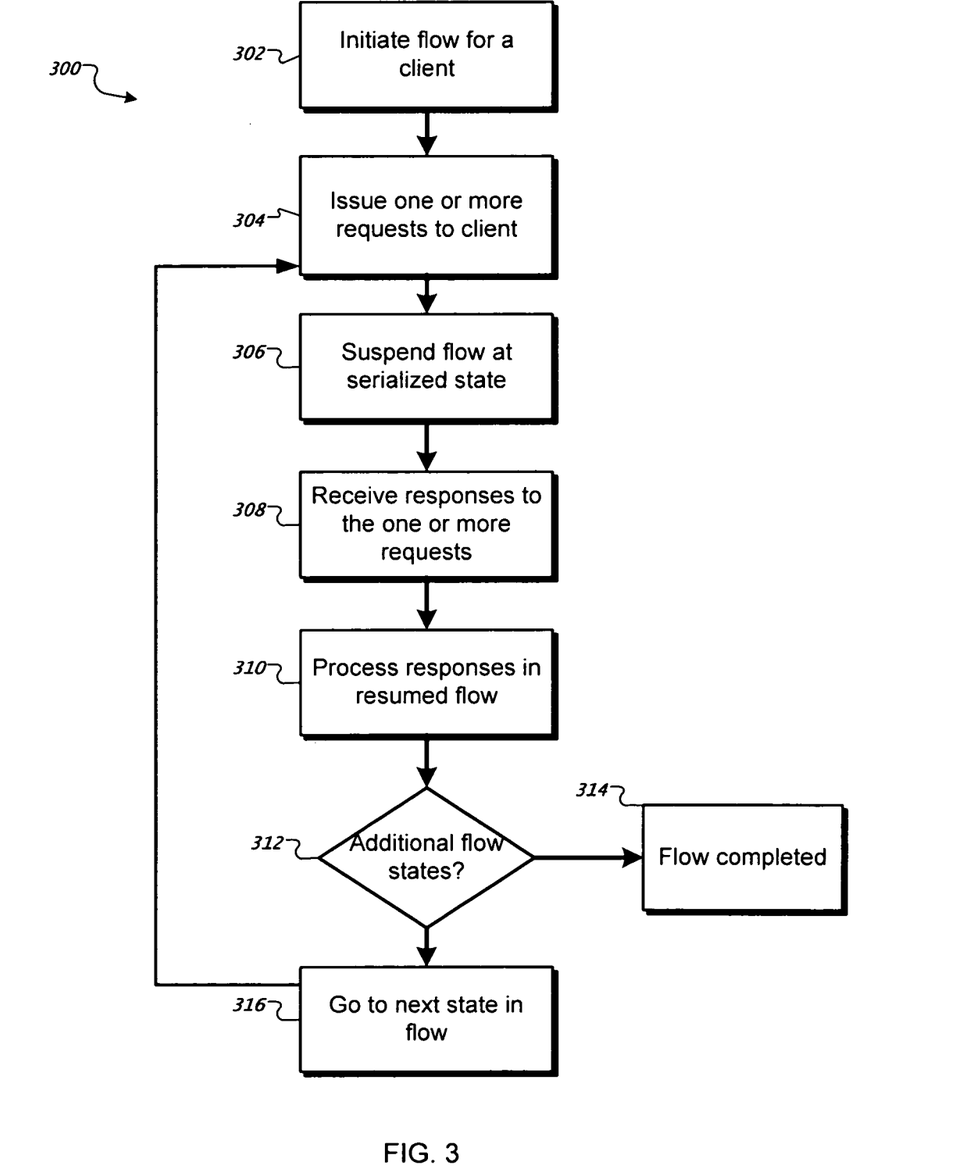
FIG. 3 is a flow diagram of an example method for executing a flow in accordance with an embodiment.

FIG. 3 is a flow diagram of an example method 300 for executing a flow. For convenience, the method 300 will be described with respect to a system having one or more computing devices that performs the process 300.

The system initiates a flow for a client 302. A flow can be initiated for a particular client when triggered by specific criteria. For example, as part of periodic forensic analysis of multiple clients or to target particular clients or client files in response to an event. The flow can be initiated, for example, to copy a file from the client. Other example tasks performed by flows include identifying files having a particular extension (e.g., .iso) and retrieving particular extents from those files; validating executable files (e.g., .exe) and reporting those that fail; identifying a file that is present on more than a specified number of devices (e.g., 20) but less than some other amount (e.g., less than half of the total devices); and retrieving a piece of raw kernel memory, extracting some values, and depending on the values, accessing pointers in that kernel memory to read out memory at that location.

The system issues one or more requests to the client 304. In particular, the flow can include a number of serialized states. Each serialized state can be associated with one or more particular tasks to be performed. Once performed, the flow can proceed to a next state. The tasks to be performed at a given state can include issuing one or more requests to the client to perform specific actions. For example, the request can be a ListDirectory request to the client. The request seeks responses identifying each file in a particular directory.

The system suspends the flow at a serialized state 306. Once the requests are sent, the flow does not need to continue using resources (e.g., memory, processors). Instead, the flow can be suspended and the system can perform other tasks (e.g., sending requests to other clients, processing other data).

The system receives responses to the one or more requests from the client 308. When each response to the one or more request is received, it is assigned to an associated message queue, as described in greater detail below. When all responses to the request have been received, the system processes the responses including resuming the serialized flow

310. The resumed flow can process the responses based on instructions in the flow. For example, in response to the ListDirectory request, multiple responses can be received, one for each file in the directory. The responses are all identified as associated with the particular flow state.

The system determines whether there are additional flow states 312. For example, the flow can include a next serialized state that includes additional requests for the client. The additional requests can be part of a sequence of steps being executed by the flow. The additional requests can also be based in part on the received responses.

If the system determines that there are additional flow states, the flow continues to the next serialized state of the flow 316. The next state can include repeating steps 304, 306, 308, 310, and 312 for the next flow state. For example, if the flow requires additional requests to be sent to the client, the flow can be suspended at the next serialized state while awaiting responses to the additional requests. If the system determines that there are no additional flow states, the flow is completed 314.

Figure 4:
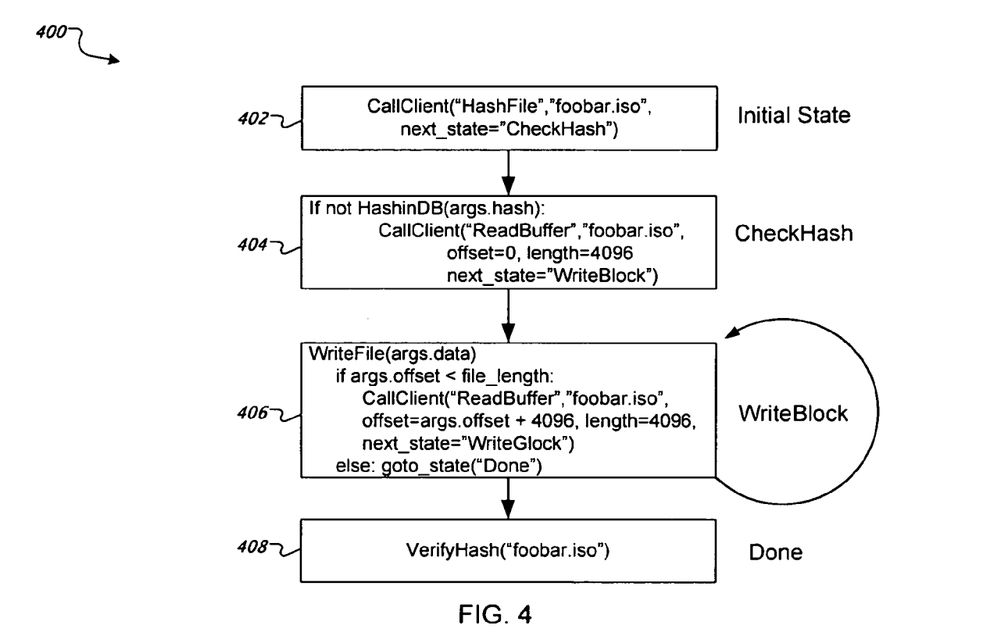
FIG. 4 is a flow diagram of an example process of a copy file flow in accordance with an embodiment.

FIG. 4 is a flow diagram of an example process 400 of a copy file flow. For convenience, the method 400 will be described with respect to a system having one or more computing devices that performs the process 400.

After initializing a flow, a request is sent to the client, requesting a hash for a particular file during an initial state 402. After sending the request, the flow is suspended and serialized to disk. When the client becomes available, the request is processed by the client and one or more responses are returned to the server. The server can then resume the flow to process the one or more responses.

The server checks the received hash during a check hash state 404. If the hash already exists in a file collection (e.g., a file database) associated with the server, there is no need to fetch it, and the flow terminates.

However, if the hash check determines the hash is not in a file collection, the file is requested. The file may be very large (e.g., an ISO image), such that it must be read in blocks, each block read with a distinct request sent to the client. The server issues each request for the file blocks and suspends the flow. The client response will return data for each of these requests, which are passed into a WriteBlock state 406. Until the file download is completed, the process is repeated with the system issuing a next request to read the next block from the client, until the entire file is transferred.

Downloading a large file from a live system can lead to an incoherent file if the file is simultaneously modified. Thus, the file request flow further requests the client to calculate a hash of the file prior to downloading, and then compares the hash once the file has completed to ensure a successful transfer 408.

The flow object is only present in memory during the state execution, where it receives responses as parameters. During this execution the flow can issue new requests, their responses targeting a different state. While the requests are pending for the client, the flow is serialized to disk and no memory is used. The client can become unavailable partway through copying the file and the copy will resume at a later time when the client returns. Thus, flows essentially maintain context state for a particular interaction with the client. This is analogous to web applications maintaining context using a session abstraction. Similarly, flows are identified using a randomly selected session identifier (session ID). All responses from the client are addressed to a specific flow using this random session ID.

As noted above, responses to a request are all associated with to a particular state in the corresponding flow object. For example if the request is a ListDirectory request many responses can be received, one for each file in the identified directory. These responses are all passed to the flow at a particular state.

In order to indicate when all responses have been sent to a particular request, the client device sends a STATUS message with a return code for the executed action. The status message can indicate that the responses have been sent without error. The status message can also contain details of any errors, for example, in the event that an action performed on the client in response to the request failed.

While the requests are described as serial messages sent in order, in practice requests from multiple concurrent flows can be batched together without waiting for responses. Thus, for example, a pair of requests can be sent together and the return responses can arrive back in any order. However, when executing the flow states (e.g., on the server), the responses are processed in the correct order. For example, when the flow proceeds to a particular state, responses associated with that state can be identified and processed.

Because a given client can become unavailable at any time (e.g. due to a reboot or loss of network connection), the execution of the flow can be resumed at a later time, when the client returns. Automatic message queuing and retransmission are used in the event that the client becomes unavailable part way through executing a client action. For example, if the ListDirectory action was requested, the client may return a partial list of filenames before the client reboots. Since the client does not maintain permanent state, the client cannot automatically resume the action once it is once again available. Consequently, when the client becomes available again, the request is retransmitted by the server and the action is re-executed by the client. However, when an iterator is used, as described above, to check-point action progress, the action can be resumed at the last checked state.

Figure 5:
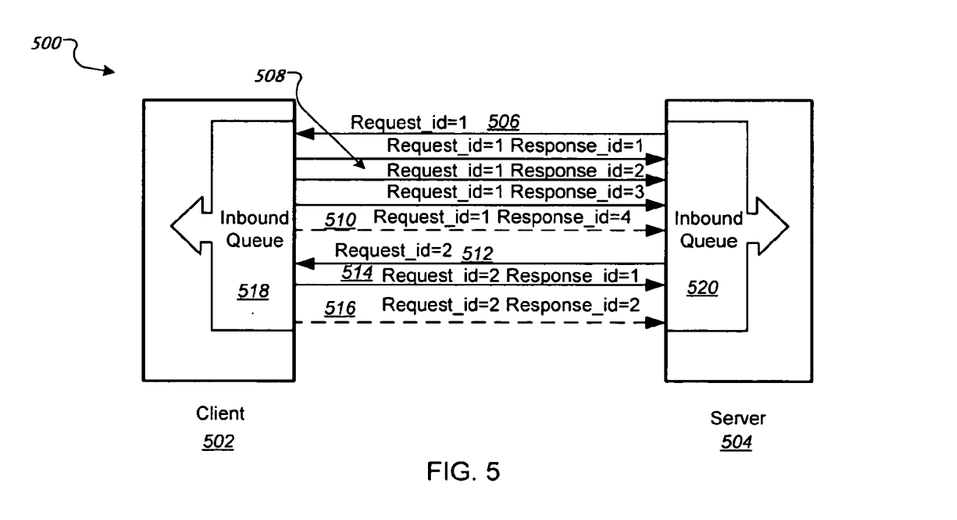
FIG. 5 is a diagram illustrating message transmission between a client and a server in accordance with an embodiment.

FIG. 5 is a diagram illustrating message transmission 500 between a client 502 and a server 504. A first request 506 is sent from the server 504 to the client 502. The first request 506 results in multiple responses 508 being returned by the client 502. For example, each response can identify a file in response to a ListDirectory request.

Once the responses 508 to the request have been sent, the client 502 sends a status message 510 to the server 504 indicating that all responses to the first request have been sent.

The server 506 can send a second request 512 after processing the responses 508 or contemporaneously with the request 506. For example, the client can include an inbound queue 518 for organizing multiple inbound requests. Similarly, the server 504 can include an inbound queue 520 for organizing received responses to different requests. The client 502 sends a response 514 to the second request as well as a status message 516 indicating that the responses to the second request 512 have been sent.

Figure 6:
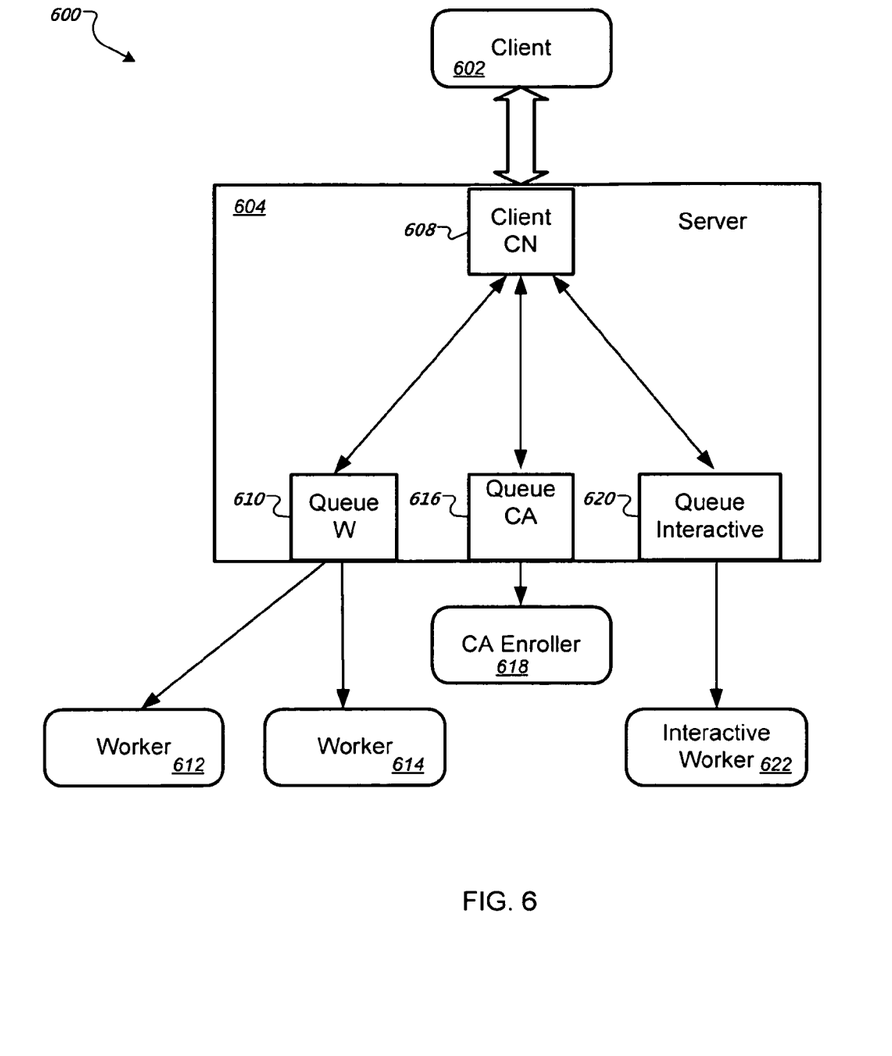
FIG. 6 is a diagram illustrating processing queues for different worker types in accordance with an embodiment.

FIG. 6 is a diagram 600 illustrating processing queues for different worker types. A client 602, of multiple clients (not shown), sends responses to a server 604 in response to one or more requests. When a response is received at the server 604, the client common name module 608 uses the unique client identifier and flow session identifier to identify the particular client flow associated with the response. Additionally, the flow session identifier indicates a particular queue for processing the responses of the flow.

The server 604 can have multiple processing queues. Each queue has an associated worker to process responses. Different workers can be specialized for specific tasks. The ability to maintain separate queues for flows allows for the implementation of several types of workers, each listening to different queues. In some implementations, the responses received from a device are assigned to a particular worker at random unless they belong to a specialized task for which particular workers are assigned to process. Additionally, specialized queues can include additional management, e.g., for load balancing queue size specifically between multiple workers specialized for the same task or type of task.

For example, as shown in FIG. 6, general purposes workers 612 and 614 retrieve responses from a general queue named queue W 610. Another specialized worker, interactive worker 622, has an associated queue 620.

A specialized worker 618 is responsible for enrolling clients and communicates with the clients using queue CA 616. This specialized worker 618 can be used, for example, due to particular security requirements needed in enrolling clients. Specifically, one security sensitive operation is the signing of new client's certificate signing requests. This requires the worker to have access to the certification authority private keys.

In some implementations, a worker that has access to private keys cannot perform any other task. This reduces the worker's vulnerability to attack. The CA worker 618 is a specialized process with access to the CA private keys. Further, the CA worker 618 only has access to the specific queue CA 616 and is unable to run any other worker flow.

The client common name module 608 can use the flow session identifier to automatically route each incoming response to the queue for a particular worker that the flow belongs to. For example, a flow session ID "W:ABCDEF" indicates that the response should be routed to queue W 610 and addresses flow "ABCDEF". Thus, the incoming request can be automatically routed to queue W 610 for processing by workers 612 or 614.

Figure 7:
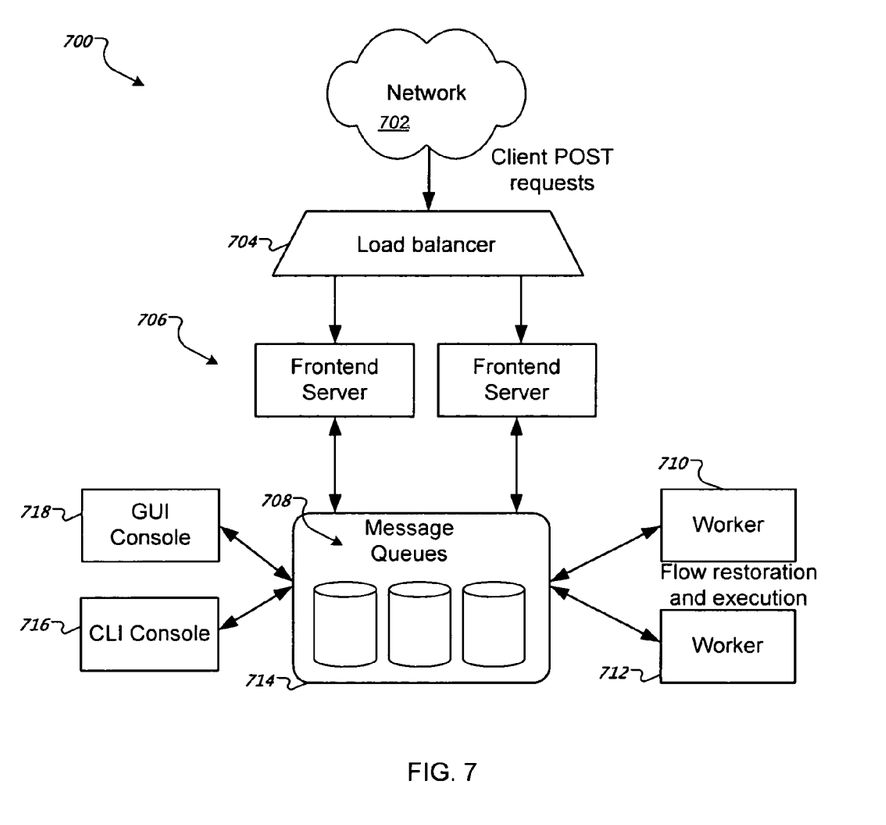
FIG. 7 is a diagram illustrating processing of flows in accordance with an embodiment.

FIG. 7 is a diagram 700 illustrating processing of flows. In particular, requests can be sent to many different devices (e.g., clients), each of which can send responses in return. A scaled environment of hundreds or thousands of devices being analyzed concurrently requires a scalable architecture. Thus, while small scale enterprises can be run using a single machine (e.g., a single server), large scale enterprises can use multiple machines (e.g., a server cluster) working in concert to provide forensic analysis.

Responses to requests are received through a network 702 and are distributed through a load balancer 704 to a group of front end servers 706. The responses can be received, for example, using HTTP POST requests in response to one or more requests sent as part of an associated flow. The front end servers 706 decrypt the responses and queue them in an appropriate queue for the flow (e.g., based on a flow session identifier) until a final status response is received for each request. Since multiple requests can be sent to multiple different machines, each of which generating one or more response, multiple queues 708 can include in process responses to requests.

When all the responses to a request are received for a particular flow request, an associated worker (e.g., worker 710 or worker 712) is notified to process the responses for the flow. The front end servers 706 can also check for pending requests to clients on the corresponding device message queue. Pending requests for a device are encrypted and sent to the client (e.g., also using an HTTP POST transaction).

Workers 710 and 712 periodically check their message queues 708 for notices of completed requests. When a completed request is received, the worker retrieves the serialized flow from a database 714 (after exclusively locking it). The flow's execution state is then restored by un-serializing it (e.g., using the pickle module). The responses are then passed into the relevant state method in the flow. While executing, the flow may issue further requests, which are placed on the device's queue in the database 714. Once the state method has completed executing, the flow is re-serialized and placed back on the database 714. In some implementations, the same flow can run on any random worker in the worker pool. For example, a group of general workers can be available to process responses for flows. The flow object contains all of its state and does not depend on global state.

In some implementations, the database 714 is a resource description framework (RDF) datastore. RDF stores information triples in the form (subject, predicate, object). The subject names begin with the common name of the device, which is a randomly distributed name (due to the hash properties). This leads to a scalable database architecture, since the RDF information space can be shared between subjects, allowing dedicated database servers to independently manage a portion of the space. For example, a system can run four RDF databases, the first managing clients with the name C:1111111 to C:3333333, the second C:3333334 to C:666666, etc.

Additionally, a console process interacts with the database 714 by starting new flows and displaying the result of completed flows. The console process can be implemented using a command line based console 716 in addition to or instead of a web based graphical user interface "GUI" console 718. The GUI console 718 can, for example, render cached data and fetch updated information in the background for client information received at an earlier time.

The GUI allows the user to schedule analysis tasks for one or more clients to be run in the future. The clients do not need to be available (e.g., online) at the time when the analysis is scheduled. Also it is possible to schedule a single analysis task for many clients at once, e.g. for all windows machines owned by executives: search the windows directory for a file of this hash. In another example task, all devices having users belonging to a certain group (e.g. legal) schedule a keyword search, but do not retrieve the files that match.

Figure 8:
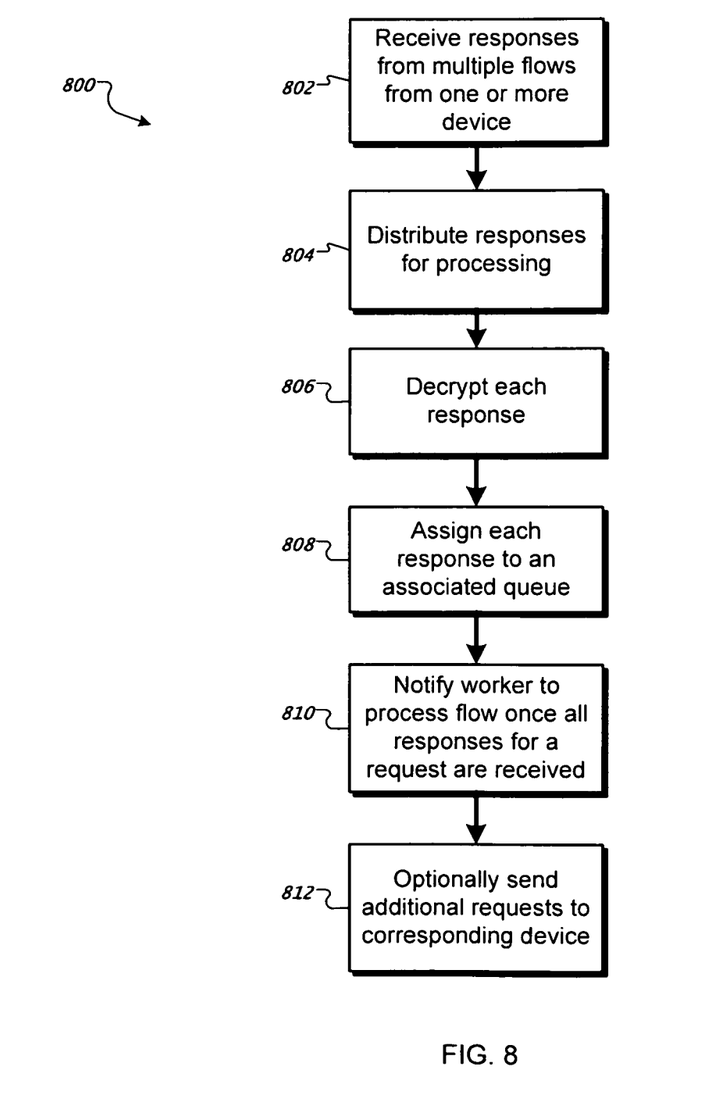
FIG. 8 is a flow diagram of an example process for processing flows in accordance with an embodiment.

FIG. 8 is a flow diagram of an example process 800 for processing flows. For convenience, the method 800 will be described with respect to a system having one or more computing devices that performs the process 800.

The system receives responses from multiple flows from one or more devices 802. The system distributes response for processing 804. For example, the system can route each received request to a particular front end server of a group of front end servers. The particular front end server can depend, for example, on the load being experienced by each front end server.

The system decrypts each response 806. Communications between devices and the system are encrypted to preserve security. The system assigns each of the decrypted responses to an associate queue 810. In some implementations, a number of general queues are available for receiving responses. In some other implementations, one or more specialized queues are reserved for responses associated with particular types of flows.

The system notifies a worker to process a particular flow once all of the responses for a request associated with that flow are received and placed in the queue. A final status message from a particular device can indicate that all response to the request have been sent. The worker can then resume the particular flow in order to process the responses and continue to a next serialized state of the flow, if any. The system optionally sends additional requests to the corresponding device as part of the resumed flow 812. The flow can then be suspended again until the corresponding response are received.

Example scenarios of using flows in an enterprise for large scale forensic analysis and incident response include investigating leaks of sensitive information; isolating targeted malware attacks; complying with discovery requests, and periodic health check snapshots. Flows can be schedule on clients in two different forms: to target a specific client or to target a specific class of clients (e.g., those using a particular operating system or at a particular location or geographic region).

An investigation into a leak of sensitive information (e.g., intellectual property or trade secrets) seeks to identify individuals who had access to the leaked information. Flows are initiated for enterprise assets identified as belonging to users with a particular level of access, where the flows include searching for specific keywords indicative of the information leaked. The search can be restricted to certain file types or directories in order to increase efficiency or comply with privacy limitations. Unallocated and deleted files can optionally be searched. As identified assets become available online, they begin to process received requests and eventually most of the assets have completed the requested search. It is possible to queue an unlimited number of flows for an indefinite length of time with no resource loading, since flows are simply serialized data stored on disk on the server.

Based on the responses from the identified assets, a list of assets is identified across the enterprise that have shown a positive hit. Further investigation can be made to isolate particular users of interest. Note that user privacy has not been compromised since user data was never copied to the server. Only the information that a user possessed files containing a keyword is established.

Isolating a malware attack on a particular assets seeks to determine whether or not the attackers have compromised other assets of the enterprise. Flows can be started looking for specific attributes of the found malware, e.g. a particular hash, file type, or typical file name. A search can also be performed for specific registry keys or even patterns in system memory particular to the running malware.

As assets come online, they each begin responding to received requests including searching for the malware infection and reporting to the central sever potential compromises. For those assets that are determined to be compromised, flows can be scheduled to force a system shutdown, or present a message box requesting the user to take their machine to system support services for a system reinstall. This rapid response can quickly incapacitate an attacker who has many systems under their control.

A discovery order requests a copy of a specific user's machine. However, in some scenarios the machine is remote and inaccessible, or the user should not be alerted to the copying. A flow is scheduled for this user's machine which remotely images the drive if network bandwidth is determined to be sufficient. Additionally, it is possible to use hash based imaging to minimize the volume of data that needs to be transmitted over the network, or perform automatic redaction to remove certain files from the image (e.g. those files containing intellectual property unrelated to the discovery request).

Periodic snapshots of automated analysis of each system's state can be collected. The snapshot can include an analysis of one or more of autorun executables and their hashes (executables automatically started at system reboot), the kernel's system service dispatch table, or a list of loaded kernel drivers. Flows are scheduled for all systems in the enterprise to run this snapshot every week. Snapshots are stored in a database. If a system is found to have been compromised, a search is initiated through the snapshots to determine when the system was compromised. As hashes of executable are collected current and past hashes can be checked against current malware databases. This allows the system to determine that a system was previously compromised in the past, using a previously unknown malware which is now known, even if the malware has already been upgraded by the attacker.

Figure 9:
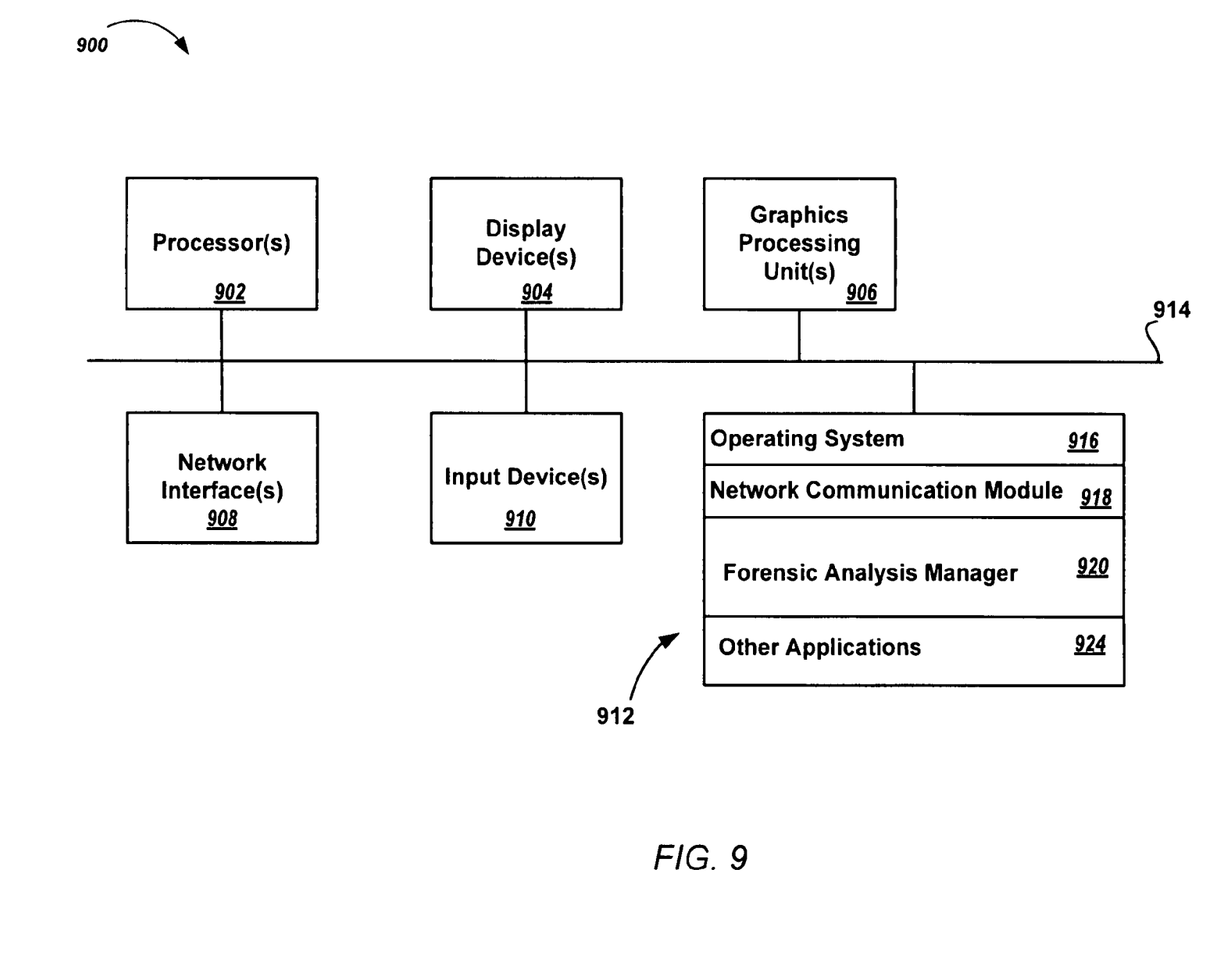
FIG. 9 is an example system in accordance with an embodiment.

FIG. 9 is an example system 900. The system 900 is capable of performing operations for storing versions of data items based on permissions. The system 900 includes one or more processors 902 (e.g., IBM PowerPC, Intel Pentium 4, etc.), one or more display devices 904 (e.g., CRT, LCD), graphics processing units 906 (e.g., NVIDIA GeForce, etc.), a network interface 908 (e.g., Ethernet, FireWire, USB, etc.), input devices 910 (e.g., keyboard, mouse, etc.), and one or more computer-readable mediums 912. These components exchange communications and data using one or more buses 914 (e.g., EISA, PCI, PCI Express, etc.).

The computer-readable medium 912 further includes an operating system 916 (e.g., Mac OS®, Windows®, Linux, etc.), a network communication module 918, a forensic analysis module 920, and other applications 924.

The operating system 916 can be multi-user, multiprocessing, multitasking, multithreading, real-time and the like. The operating system 916 performs basic tasks, including but not limited to: recognizing input from input devices 910; sending output to display devices 904; keeping track of files and directories on computer-readable mediums 912 (e.g., memory or a storage device); controlling peripheral devices (e.g., disk drives, printers, etc.); and managing traffic on the one or more buses 914. The network communications module 918 includes various components for establishing and maintaining network connections (e.g., software for implementing communication protocols, such as TCP/IP, HTTP, Ethernet, etc.).

The forensic analysis module 920 provides various software components for performing the various functions for performing distributed forensic analysis, as described with respect to FIGS. 1-8.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method performed by data processing apparatus, the method comprising:
   sending, by the data processing apparatus, one or more requests to a client as part of a first serialized state of a serialized flow with specified serialization points, wherein the first serialized state comprises the one or more requests for the client to perform one or more forensic actions which are processed by the data processing apparatus for forensic analysis of the client, wherein the first serialized state is one of a plurality of serialized states of the serialized flow, each of the serialized states associated with one or more forensic actions to be performed by the client, and wherein the serialized flow is scheduled for a time when the client is not online and the client begins performing the one or more forensic actions when the client comes online;
   when the serialized flow reaches one of the specified serialization points, suspending, by the data processing apparatus, execution of the serialized flow at the first serialized state until responses to the one or more requests are received;
   receiving from the client, at the data processing apparatus, the responses to the one or more requests and directing the responses to a particular message queue of a plurality of message queues, wherein the particular message queue is identified based on the client;
   after receiving an indication from the client that all responses to the one or more requests have been sent, resuming, by the data processing apparatus, the serialized flow at the first serialized state to process the received responses; and
   advancing, by the data processing apparatus, the serialized flow to a second serialized state of the plurality of serialized states once the responses in the particular message queue have been processed, wherein the advancing comprises sending to the client, one or more additional requests for the client to perform one or more additional forensic actions associated with the second serialized state.

2. The method of claim 1, wherein the advancing the serialized flow to the second serialized state further includes suspending the serialized flow at the second serialized state.

3. The method of claim 1, wherein one or more different serialized flows can be active while the serialized flow is suspended at the first serialized state.

4. The method of claim 1, wherein the specified serialization points are defined serialization points for suspending the serialized flow.

5. The method of claim 1, wherein each request of the one or more requests causes the client to execute a client action.

6. The method of claim 1, wherein the indication from the client comprises a status message that all responses have been received.

7. The method of claim 1, wherein the serialized flow is to copy a file from the client.

8. The method of claim 1, further comprising:
   receiving a progress update to a request of the one or more requests, the progress update including a state of a client action being performed; and
   sending the received state to the client in response to a failure in the client action.

9. The method of claim 1, wherein the data processing apparatus comprises a plurality of processes, each of the processes being associated with one of the plurality of message queues; and
   for each of the plurality of message queues, providing a notification to the associated process to resume a flow from a suspended serialized state to process corresponding responses in the associated message queue once all responses for an associated request are received.

10. The method of claim 9, further comprising:
    decrypting each of the received responses before assigning to the particular message queue.

11. The method of claim 9, wherein the providing the notification includes sending a message to a message queue of the associated process.

12. A non-transitory computer storage medium encoded with a computer program, the program comprising instructions that in response to execution by a data processing apparatus cause the data processing apparatus to perform operations comprising:
    sending one or more requests to a client as part of a first serialized state of a serialized flow with specified serialization points, wherein the first serialized state comprises the one or more requests for the client to perform one or more forensic actions which are processed by the data processing apparatus for forensic analysis of the client, wherein the first serialized state is one of the plurality of serialized states of the serialized flow, each of the serialized states associated with one or more forensic actions to be performed by the client, and wherein the serialized flow is scheduled for a time when the client is not online and the client begins performing the one or more forensic actions when the client comes online;
    when the serialized flow reaches one of the specified serialization points, suspending execution of the serialized flow at the first serialized state until responses to the one or more requests are received;
    receiving from the client the responses to the one or more requests and directing the responses to a particular message queue of a plurality of message queues, wherein the particular message queue is identified based on the client;
    after receiving an indication from the client that all responses to the one or more requests have been sent, resuming the serialized flow at the first serialized state to process the received responses; and
    advancing the serialized flow to a second serialized state of the plurality of serialized states once the responses in the particular message queue have been processed, wherein the advancing comprises sending to the client, one or more additional requests for the client to perform one or more additional forensic actions associated with the second serialized state.

13. The non-transitory computer storage medium of claim 12, wherein the advancing the serialized flow to the second serialized state further includes suspending the serialized flow at the second serialized state.

14. The non-transitory computer storage medium of claim 12, wherein different serialized flows can be active while the serialized flow is suspended at the first serialized state.

15. The non-transitory computer storage medium of claim 12, wherein the specified serialization points are defined serialization points for suspending the serialized flow.

16. The non-transitory computer storage medium of claim 12, wherein each request of the one or more requests causes the client to execute a client action.

17. The non-transitory computer storage medium of claim 12, wherein the indication from the client comprises a status message that all responses have been received.

18. The non-transitory computer storage medium of claim 12, wherein the serialized flow is to copy a file from the client.

19. The non-transitory computer storage medium of claim 12, further comprising instructions that in response to execution by the data processing apparatus cause the data processing apparatus to perform operations comprising:
receiving a progress update to a request of the one or more requests, the progress update including a state of a client action being performed; and
sending the received state to the client in response to a failure in the client action.

20. The non-transitory computer storage medium of claim 12, wherein the data processing apparatus comprises a plurality of processes, each of the processes being associated with one of the plurality of message queues; and
for each of the plurality of message queues, providing a notification to the associated process to resume a flow from a suspended serialized state to process corresponding responses in the associated message queue once all responses for an associated request are received.

21. The non-transitory computer storage medium of claim 20, further comprising instructions that in response to execution by the data processing apparatus cause the data processing apparatus to perform operations comprising:
decrypting each of the received responses before assigning to the particular message queue.

22. The non-transitory computer storage medium of claim 20, wherein the providing the notification includes sending a message to a message queue of the associated process.

23. A system comprising:
one or more computers that collectively comprise memory and a processor configured to perform operations including:
sending one or more requests to a client as part of a first serialized state of a serialized flow with specified serialization points, wherein the first serialized state comprises the one or more requests for the client to perform one or more forensic actions which are processed by the one or more computers for forensic analysis of the client, wherein the first serialized state is one of a plurality of serialized states of the serialized flow, each of the serialized states associated with one or more forensic actions to be performed by the client, and wherein the serialized flow is scheduled for a time when the client is not online and the client begins performing the one or more forensic actions when the client comes online;
when the serialized flow reaches one of the specified serialization points, suspending execution of the serialized flow at the first serialized state until responses to the one or more requests are received;
receiving from the client the responses to the one or more requests and directing the responses to a particular message queue of a plurality of message queues, wherein the particular message queue is identified based on the client;
after receiving an indication from the client that all responses to the one or more requests have been sent, resuming the serialized flow at the first serialized state to process the received responses; and
advancing the serialized flow to a second serialized state of the plurality of serialized states once the responses in the particular message queue have been processed, wherein the advancing comprises sending to the client, one or more additional requests for the client to perform one or more additional forensic actions associated with the second serialized state.

24. The system of claim 23, wherein the one or more computers comprise a server configured to interact with the client through a data communication network.

25. The system of claim 23, wherein the advancing the serialized flow to the second serialized state further includes suspending the serialized flow at the second serialized state.

26. The system of claim 23, wherein one or more different serialized flows can be active while the serialized flow is suspended at the first serialized state.

27. The system of claim 23, wherein the specified serialization points are defined serialization points for suspending the serialized flow.

28. The system of claim 23, wherein each request of the one or more requests causes the client to execute a client action.

29. The system of claim 23, wherein the indication from the client comprises a status message that all responses have been received.

30. The system of claim 23, wherein the serialized flow is to copy a file from the client.

31. The system of claim 23, further configured to perform operations comprising:
receiving a progress update to a request of the one or more requests, the progress update including a state of a client action being performed; and
sending the received state to the client in response to a failure in the client action.

32. The system of claim 23, wherein the one or more computers comprises a plurality of processes, each of the processes being associated with one of the plurality of message queues; and
wherein the one or more computers are further configured to perform operations including:
for each of the plurality of message queues, providing a notification to the associated process to resume a flow from a suspended serialized state to process corresponding responses in the associated message queue once all responses for an associated request are received.

33. The system of claim 32, further configured to perform operations comprising:
decrypting each of the received responses before assigning to the particular message queue.

34. The system of claim 32, wherein the providing the notification includes sending a message to a message queue of the associated process.

* * * * *